(12) United States Patent
Grant et al.

(10) Patent No.: US 10,032,345 B2
(45) Date of Patent: Jul. 24, 2018

(54) WEARABLE DEVICE WITH FLEXIBLY MOUNTED HAPTIC OUTPUT DEVICE

(71) Applicant: IMMERSION CORPORATION, San Jose, CA (US)

(72) Inventors: Danny A. Grant, Laval (CA); Vincent Levesque, Montreal (CA); Elena Redelsheimer, San Jose, CA (US); Daniel Gregory Parker, San Francisco, CA (US)

(73) Assignee: IMMERSION CORPORATION, San Jose, CA (US)

( * ) Notice: Subject to any disclaimer, the term of this patent is extended or adjusted under 35 U.S.C. 154(b) by 18 days.

(21) Appl. No.: 14/243,313

(22) Filed: Apr. 2, 2014

(65) Prior Publication Data
US 2015/0287293 A1 Oct. 8, 2015

(51) Int. Cl.
*G08B 6/00* (2006.01)
*G06F 1/16* (2006.01)
*G06F 3/01* (2006.01)

(52) U.S. Cl.
CPC ............... *G08B 6/00* (2013.01); *G06F 1/163* (2013.01); *G06F 3/016* (2013.01)

(58) Field of Classification Search
CPC ......... G06F 1/163; G06F 3/016; A61B 5/681; A61B 5/6824; G08B 6/00; A63B 2071/0655; A63B 2071/0663; G10K 2210/1129
See application file for complete search history.

(56) References Cited

U.S. PATENT DOCUMENTS

| | | | |
|---|---|---|---|
| 5,361,241 A | 11/1994 | Ferrara et al. | |
| 5,565,840 A * | 10/1996 | Thorner | A63F 13/02 340/323 R |
| 6,088,017 A * | 7/2000 | Tremblay | G06F 3/011 345/156 |
| 6,675,743 B1 * | 1/2004 | Jeffrey | A01K 13/006 119/850 |
| 2003/0025595 A1 * | 2/2003 | Langberg | 340/407.1 |
| 2004/0173220 A1 * | 9/2004 | Harry | A43B 3/0005 128/892 |
| 2006/0015045 A1 * | 1/2006 | Zets et al. | 601/78 |
| 2007/0167885 A1 * | 7/2007 | Moon | A61H 11/00 601/71 |
| 2008/0100177 A1 * | 5/2008 | Dai et al. | 310/317 |
| 2008/0153590 A1 * | 6/2008 | Ombrellaro | A63F 13/02 463/30 |
| 2009/0023122 A1 * | 1/2009 | Lieberman | G09B 19/003 434/258 |

(Continued)

OTHER PUBLICATIONS

Extended European Search Report as issued in European Patent Application No. 15161795.8, dated Jul. 31, 2015.

*Primary Examiner* — Nay Tun
(74) *Attorney, Agent, or Firm* — Medler Ferro Woodhouse & Mills PLLC

(57) ABSTRACT

A system includes a wearable device configured to be worn by a user. The wearable device includes a flexible mounting, and a haptic output device connected to the flexible mounting. The system includes a signal generator configured to generate a haptic signal and communicate the haptic signal to the haptic output device. The haptic signal includes a short duration control pulse configured to create a small deformation sensation to the user.

17 Claims, 6 Drawing Sheets

(56) References Cited

U.S. PATENT DOCUMENTS

| | | | |
|---|---|---|---|
| 2011/0295156 A1* | 12/2011 | Arturi | 600/587 |
| 2013/0069862 A1 | 3/2013 | Ur | |
| 2013/0127607 A1 | 5/2013 | Parker et al. | |
| 2013/0191741 A1 | 7/2013 | Dickinson et al. | |
| 2013/0220392 A1* | 8/2013 | Gassert et al. | 135/66 |
| 2014/0028614 A1* | 1/2014 | Bae et al. | 345/174 |
| 2014/0236056 A1* | 8/2014 | MacGuinness | A61H 11/00 601/46 |

* cited by examiner

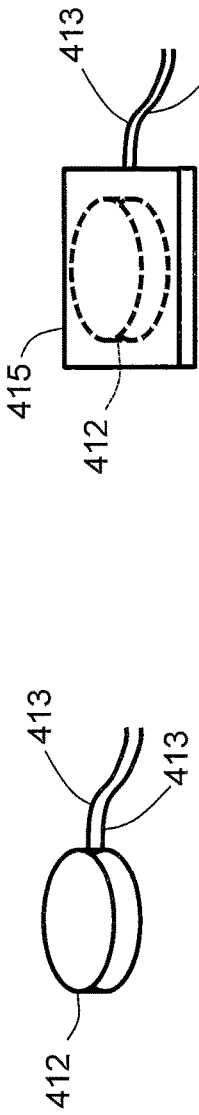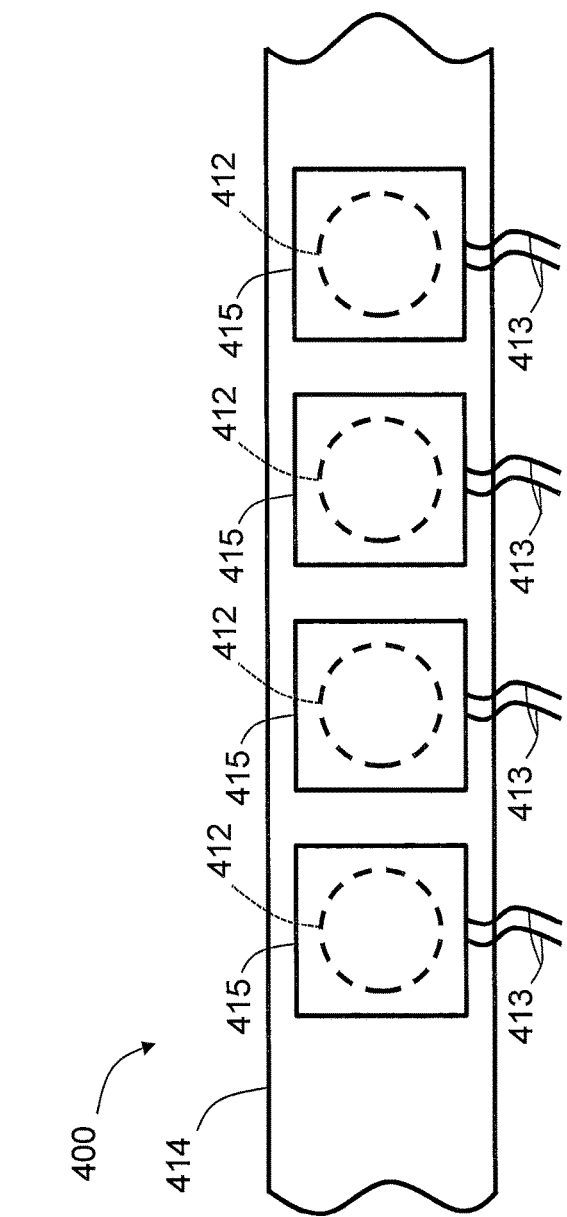

WEARABLE DEVICE WITH FLEXIBLY MOUNTED HAPTIC OUTPUT DEVICE

FIELD

The present invention is directed to a wearable device that includes a flexibly mounted haptic output device.

BACKGROUND

The wearable user device market has emerged and is expected to grow rapidly. Haptics may play a large role in the communication of information to users via wearable devices, which may be non-visual or may enhance the visual aspect of the device the user is interacting with. Typical inertial actuators, such as Eccentric Rotating Mass ("ERM") actuators, are mounted in a rigid casing and create a range of vibration frequencies and magnitudes that can be conveyed to a user of a user interface device, such as a cellular phone or a smartphone.

SUMMARY

It is desirable to provide a range of haptic effects to users of wearable devices. It is also desirable to provide a lower cost option, in terms of both material costs and power consumption, to provide haptic effects to users of wearable devices.

According to an aspect of the invention, there is provided a system that includes a wearable device configured to be worn by a user. The wearable device includes a flexible mounting, and a haptic output device connected to the flexible mounting. The system includes a signal generator configured to generate a haptic signal and communicate the haptic signal to the haptic output device. The haptic signal includes a short duration control pulse configured to create a small deformation sensation to the user.

In an embodiment, the short duration control pulse is less than 100 ms, or less than 50 ms, or less than 30 ms in duration.

In an embodiment, the wearable device includes the signal generator.

In an embodiment, the system includes a user interface device, and the user interface device comprises the signal generator.

In an embodiment, the flexible mounting includes a flexible casing, and the haptic output device is carried by the flexible casing.

In an embodiment, the flexible mounting includes a spring connected to the haptic output device.

In an embodiment, the flexible mounting includes a damper connected to the haptic output device.

In an embodiment, the haptic output device is connected to the flexible mounting so that the haptic output device is in contact with the user's skin when worn by the user.

In an embodiment, a plurality of haptic output devices are connected to a plurality of flexible mountings, and the signal generator is configured to generate a plurality of haptic signals and communicate the haptic signals to the plurality of haptic output devices. The plurality of haptic signals include short duration control pulses to create small deformation sensations to the user.

In an embodiment, the signal generator is configured to generate the plurality of haptic signals and communicate the haptic signals to the plurality of haptic output devices to create at least one directional haptic effect.

In an embodiment, the signal generator is configured to generate the plurality of haptic signals and communicate the haptic signals to the plurality of haptic output devices to create at least one localized haptic effect.

In an embodiment, the signal generator is configured to generate the plurality of haptic signals and communicate the haptic signals to the plurality of haptic output devices to create a haptic effect in a spatial pattern.

According to an aspect of the invention, there is provided a method that includes connecting a haptic output device to a flexible mounting as part of a wearable device configured to be worn by a user, generating a haptic signal comprising a short duration control pulse, and energizing the haptic output device with the short duration control pulse.

In an embodiment, the method includes connecting a plurality of haptic output devices to a plurality of flexible mountings as part of the wearable device configured to be worn by the user, generating a plurality of haptic signals comprising short duration control pulses, and energizing the plurality of haptic output devices with the short duration control pulses to create small deformation sensations to the user.

In an embodiment, the plurality of haptic output devices are energized to create at least one directional haptic effect.

In an embodiment, the plurality of haptic output devices are energized to create at least one localized haptic effect.

In an embodiment, the plurality of haptic output devices are energized to create a haptic effect in a spatial pattern.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIG. 4A is a schematic illustration of a haptic output device of the system of FIG. 1, in accordance with embodiments of the invention;

FIG. 4B is a schematic illustration of the haptic output device of FIG. 4A in a flexible casing, in accordance with embodiments of the invention;

FIG. 4C is a schematic illustration of a plurality of the flexible casings illustrated in FIG. 4B attached to a flexible mounting, in accordance with embodiments of the invention;

DETAILED DESCRIPTION

Figure 1:
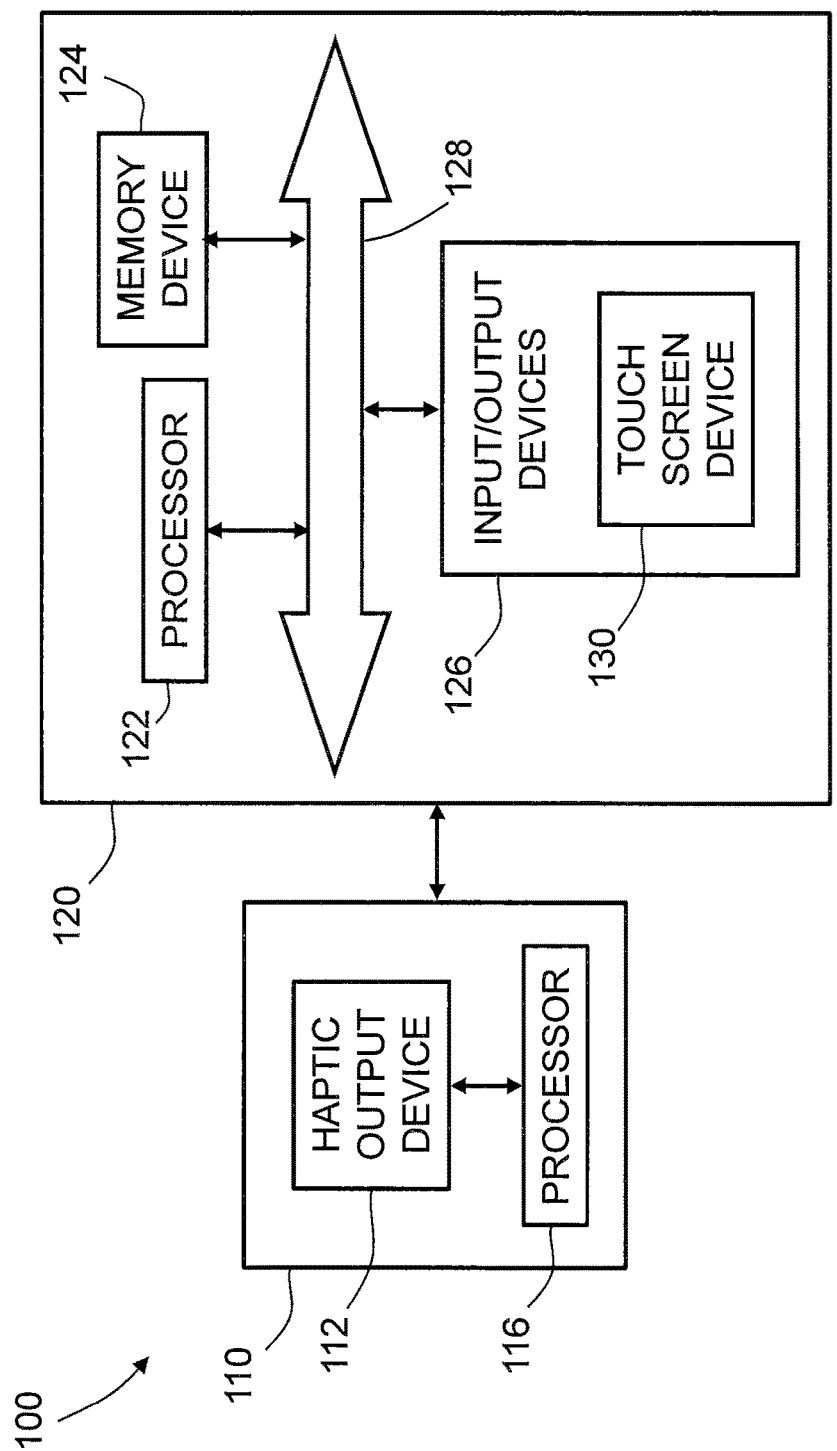
FIG. 1 is a schematic illustration of a system in accordance with embodiments of the invention.

FIG. 1 illustrates a system 100 according to embodiments of the invention. As illustrated, the system 100 includes a wearable device 110 and a user interface device 120 in signal communication with the wearable device 110. In an embodiment, the user interface device 120 may be part of the wearable device 110. In an embodiment, the wearable device 110 and the user interface device 120 may be separate devices. The user interface device 120 may be any device, such as a desktop computer, laptop computer, electronic workbook, electronic handheld device (such as a mobile phone, gaming device, personal digital assistant ("PDA"), portable e-mail device, portable Internet access device, calculator, etc.), kiosk (such as an automated teller machine, ticket purchasing machine, etc.), printer, point-of-sale device, gaming device, or other electronic device.

Figure 2:
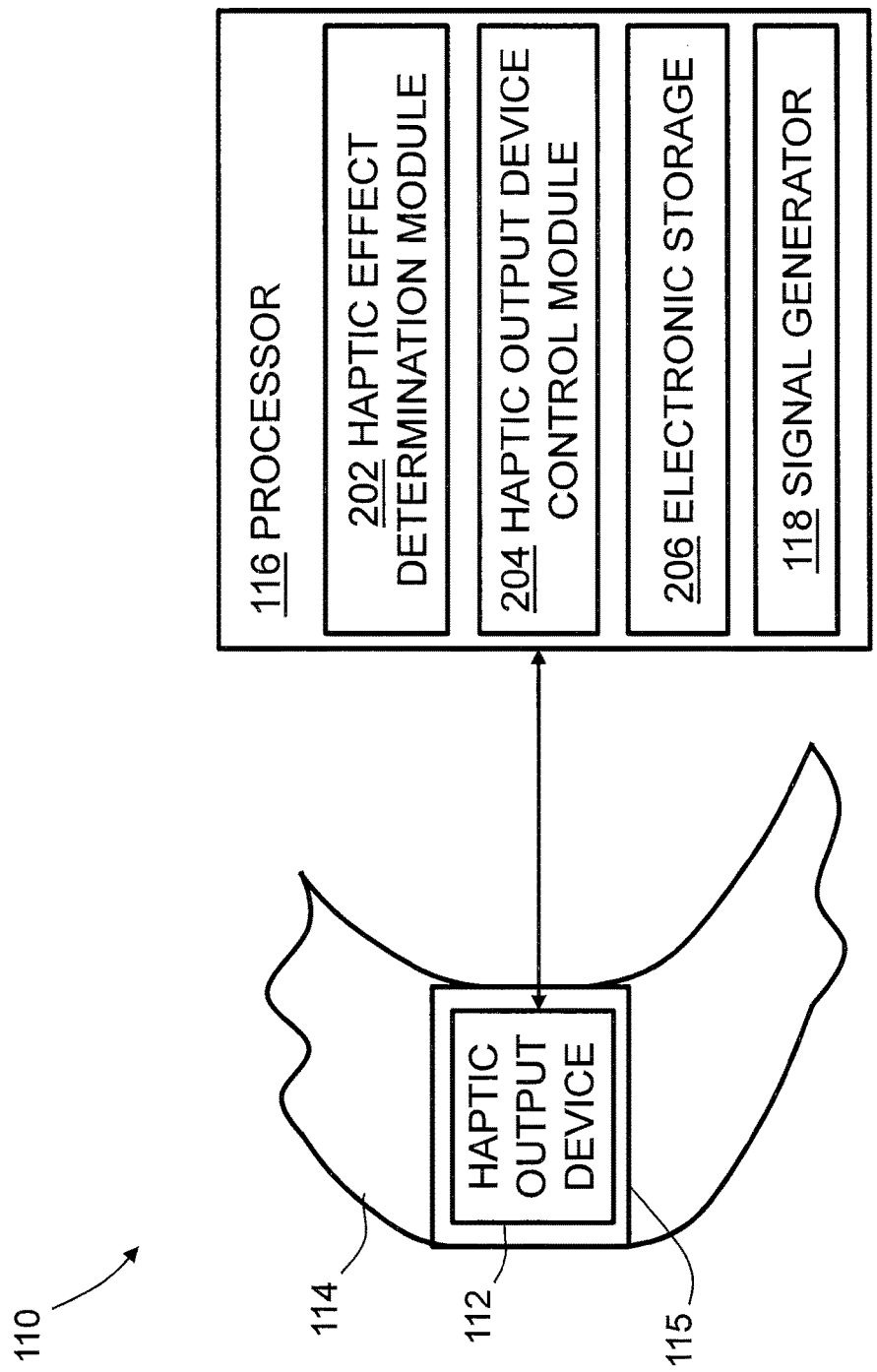
FIG. 2 is a schematic illustration of a wearable device of the system of FIG. 1, in accordance with embodiments of the invention.

The wearable device 110, which is shown in further detail in FIG. 2, includes a haptic output device 112 that is connected to a wearable member 114 via a flexible mounting 115 (illustrated in FIG. 2). The wearable member 114 may be any member or article that is configured to be worn by the user, such as an accessory or an article of clothing. The haptic feedback provided by the haptic output device 112 may be created with any of the methods of creating haptic effects, such as vibration, deformation, kinesthetic sensations, electrostatic or ultrasonic friction, etc. In an embodiment, the haptic output device 112 may include an actuator, for example, an inertial actuator. The inertial actuator may be an electromagnetic actuator such as an Eccentric Rotating Mass ("ERM") actuator in which an eccentric mass is moved by a motor, or a Linear Resonant Actuator ("LRA") in which a mass attached to a spring is driven back and forth. The haptic output device may include an actuator that includes a "smart material" such as piezoelectric materials, electro-active polymers or shape memory alloys, or may include a macro-composite fiber actuator, an electro-static actuator, an electro-tactile actuator, and/or another type of actuator that provides a physical feedback such as vibrotactile feedback. The haptic output device 112 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. Multiple haptic output devices 112 may be used to generate different haptic effects.

The wearable device 110 also includes a processor 116 that includes a signal generator 118 (illustrated in FIG. 2) configured to generate a haptic signal and communicate the haptic signal to the haptic output device 112. The processor 116 may be specifically designed as an application-specific integrated circuit ("ASIC") to control output signals to a driver of the haptic output device 112. The processor 116 may be configured to decide, based on predefined factors, what haptic effects are to be generated, the order in which the haptic effects are generated, and the magnitude, frequency, duration, and/or other parameters of the haptic effects. The processor 116 may also be configured to provide streaming commands that can be used to drive the haptic output device 112 to provide a particular haptic effect.

FIG. 2 illustrates the wearable device 110 in further detail. In an embodiment, the haptic output device 112 is connected to the flexible mounting 115 so that the haptic output device 112 comes into contact with the user's skin when the wearable device 110 is placed on the user. In an embodiment, the haptic output device 112 is connected to the flexible mounting 115 so that the haptic output device 112 is on the side of the wearable member 114 that is opposite the user's skin so that only the wearable member 114 touches or conforms to the user's skin when the wearable device 110 is placed on the user. In an embodiment, the haptic output device 112 and the flexible mounting 115 may be embedded in the wearable member 114 so that they are completely surrounded by the wearable member 114. The connection of the haptic output device 112 to wearable member 114 via the flexible mounting 115 is discussed in further detail below.

The processor 116 may be configured to execute one or more computer program modules. The one or more computer program modules may include one or more of a haptic effect determination module 202, a haptic output device control module 204, and/or other modules. The processor 116 may be configured to execute the modules 202 and/or 204 by software, hardware, firmware, some combination of software, hardware, and/or firmware, and/or other mechanisms for configuring processing capabilities on processor 116. It should be appreciated that although modules 202 and 204 are illustrated in FIG. 2 as being co-located within a single processing unit, in embodiments in which the processor 116 includes multiple processing units, one or more of modules 202 and 204 may be located remotely from the other module. For example, the haptic effect determination module 202 may reside in a processor 122 of the user interface device 120, which is illustrated in FIG. 1 and described in further detail below.

The description of the functionality provided by the different modules 202 and 204 described below is for illustrative purposes, and is not intended to be limiting, as either of the modules 202 and 204 may provide more or less functionality than is described. For example, one of the modules 202 and 204 may be eliminated, and some or all of its functionality may be provided by the other module. As another example, the processor 116 may be configured to execute one or more additional modules that may perform some or all of the functionality attributed below to one of the modules 202 and 204.

The haptic effect determination module 202 is configured to determine the haptic effect or sensation to be generated by the haptic output device 112 for the user, based on information received from the user interface device 120. Determining the haptic effect may include determining one or more parameters that include an amplitude, frequency, duration, etc., of the haptic sensation that is to be provided to the user to enhance one or more aspects of the experience provided by the system 100 to the user.

The haptic output device control module 204 is configured to control the signal generator 118 that generates the control signals for the haptic output device 112, and generate the haptic effect determined by haptic effect determination module 202. This includes communicating the haptic output signal generated by the signal generator 118 to the haptic output device 112. The haptic effect to be generated may be communicated over wired communication links, wireless communication links, and/or other communication links between the processor 116 and the haptic output device 112. In an embodiment, at least a portion of the functionality attributed to the haptic output device control module 204 may be disposed in a processor carried by the haptic output device 112. In an embodiment, the signal generator 118 may be part of the haptic output device 112. In an embodiment, the processor 116 may be part of the haptic output device 112. The illustrated embodiments should not be considered to be limiting in any way.

The processor 116 may also include electronic storage 206. The electronic storage 206 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 112 is to be driven, or other information for generating haptic effects.

Returning to FIG. 1, the user interface device 120 includes a processor 122, a memory device 124, and input/output devices 126, which are interconnected via a bus 128. In an embodiment, the input/output devices 126 may include a touch screen device 130 and/or other human-computer interface devices.

The touch screen device 130 may be configured as any suitable human-computer interface or touch/contact surface assembly. The touch screen device 130 may be any touch screen, touch pad, touch sensitive structure, computer monitor, laptop display device, workbook display device, kiosk screen, portable electronic device screen, or other suitable touch sensitive device. The touch screen device 130 may be configured for physical interaction with a user-controlled device, such as a stylus, finger, etc. In some embodiments, the touch screen device 130 may include at least one output device and at least one input device. For example, the touch screen device 130 may include a visual display and a touch sensitive screen superimposed thereon to receive inputs from a user's finger. The visual display may include a high definition display screen.

In addition to the touch screen device 130, the input/output devices 126 may also include specific input mechanisms and output mechanisms. For example, the input mechanisms may include such devices as keyboards, keypads, cursor control devices (e.g., computer mice), or other data entry devices. Output mechanisms may include a computer monitor, virtual reality display device, audio output device, printer, or other peripheral devices, such as a gamepad. The input/output devices 126 may include mechanisms that are designed to not only receive input from a user, but also provide feedback to the user, such as many examples of touch screen devices.

The processor 122 may be a general-purpose or specific-purpose processor or microcontroller for managing or controlling the operations and functions of the user input device 120. For example, the processor 122 may be specifically designed as an application-specific integrated circuit ("ASIC") to control output signals to the input/output devices 126 and to process signals received from the input/output devices 126. The processor 122 may be configured to decide, based on predefined factors, what haptic effects are to be generated, the order in which the haptic effects are generated, and the magnitude, frequency, duration, and/or other parameters of the haptic effects. The processor 122 may also be configured to provide streaming commands that can be used to drive the haptic output device 112 for providing a particular haptic effect. In some embodiments, the processor 122 may actually include a plurality of processors, each configured to perform certain functions within the user interface device 120. As described above, one or more of the modules 202, 204 of the processor 116 may be located in the processor 122 of the user interface device 120. The illustrated embodiments are not intended to be limiting in any way.

The memory device 124 may include one or more internally fixed storage units, removable storage units, and/or remotely accessible storage units. The various storage units may include any combination of volatile memory and non-volatile memory. The storage units may be configured to store any combination of information, data, instructions, software code, etc.

Figure 3:
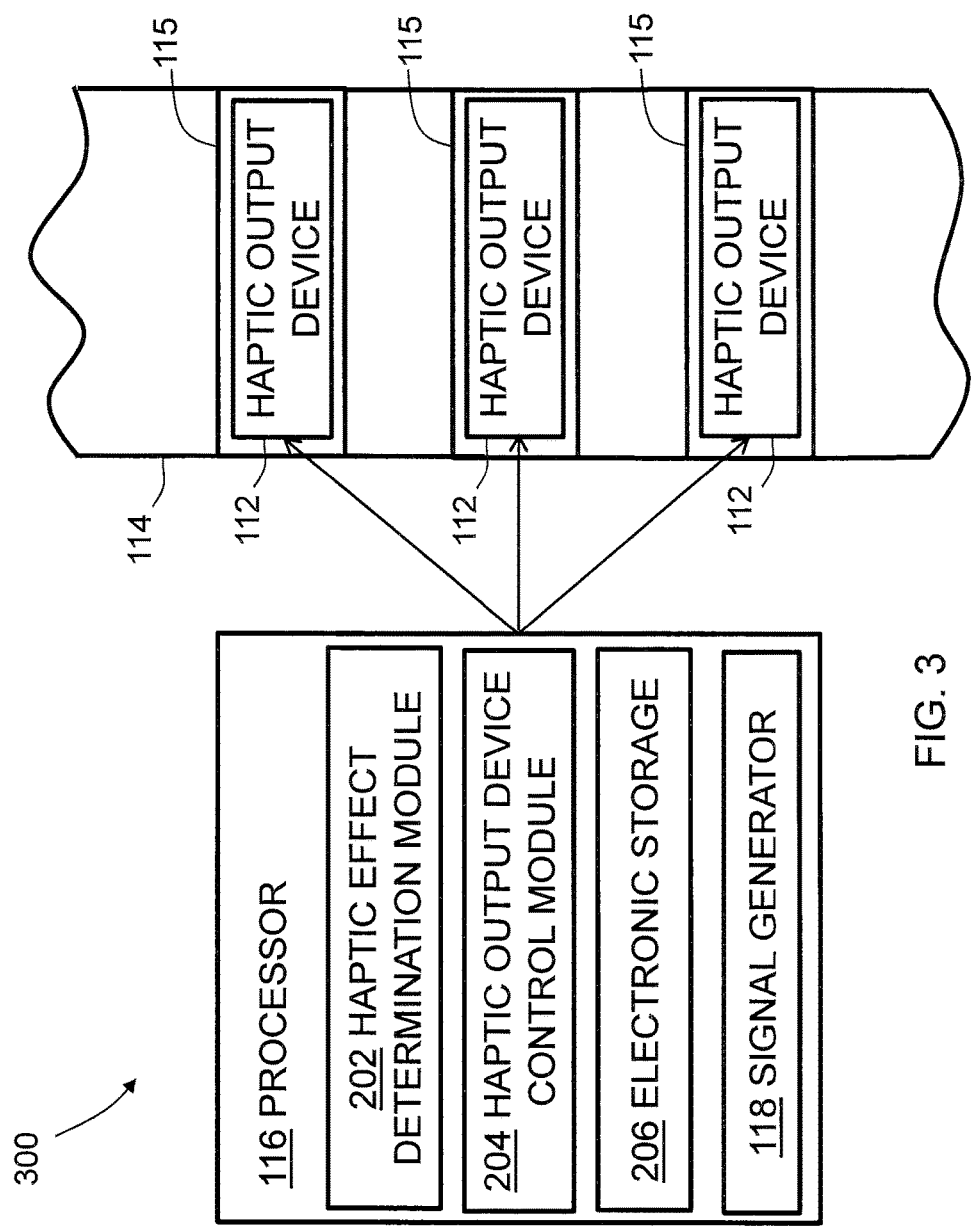
FIG. 3 is a schematic illustration of a wearable device of the system of FIG. 1, in accordance with embodiments of the invention.

FIG. 3 illustrates an embodiment of a wearable device 300 that includes a plurality of haptic output devices 112 that are connected to the wearable member 114 via a plurality of flexible mountings 115. For example, in an embodiment, two, three, four, or more haptic output devices 112 may be spaced apart and connected to the wearable member 114 via the flexible mounting 115 using any of the means described below. The signal generator 118 may generate signals for and communicate the signals to each of the haptic output devices 112. The haptic effect determination module 202 may determine that the haptic output devices 112 should generate haptic effects or sensations sequentially, in synchronization, or in a particular pattern or sequence to create a spatial sensation. The haptic output device control module 204 may determine which signals the signal generator 118 should generate and communicate to the haptic output devices 112 based on such a determination. In an embodiment, the processor 116 may be programmed with information on the arrangement of the haptic output devices 112 so that spatial haptic effects may be created. In an embodiment, the haptic output devices 112 may be daisy chained together and their spatial relation to one another specified so that spatial haptic effects may be created. In an embodiment, the haptic output devices 112 may be connected to output ports at specific locations on the wearable member 114, with wires embedded in the wearable member 114, such that the processor 116 knows where each haptic output device 112 is located.

FIG. 4A illustrates an embodiment of the haptic output device in the form of an ERM actuator 412, which has wires 413 extending therefrom. The wires 413 may be connected to a power source and/or the processor 116, as is known by one of ordinary skill in the art. In an embodiment, the ERM actuator 412 may be a low cost coin-type ERM actuator 412.

FIG. 4B illustrates an embodiment of a flexible mounting in the form of a flexible casing 415 that carries the ERM actuator 412 such that the flexible casing 415 surrounds the body of the ERM actuator 412, but allows the wires 413 to extend out of the flexible casing 415. The flexible casing 415 may be made from any suitable flexible material, such as a flexible rubber or plastic material, such as an elastomeric plastic material. The flexible casing 415 may then be connected to or embedded in a wearable member 414 to create an embodiment of a wearable device 400, as illustrated in FIG. 4C, which shows four ERM actuators 412 connected to the wearable member 414 via the flexible casings 415. The flexible casing 415 may be connected to the wearable member 414 by any suitable means, such as an adhesive or the like. In an embodiment, the flexible casings 415 may be sewn to the wearable member 414, or connected via a hook and loop-type fastener (e.g. VELCRO® manufactured by Velcro Industries B.V.). The orientation of the ERM actuators 412 illustrated in FIG. 4C orient the force axes of the actuators tangent to the user's skin when the user wears the wearable device 400, and when haptic drive signals are communicated to the ERM actuators 412, the primary haptic sensations will be tangent to the user's skin. Larger sensations may be possible by mounting the ERM actuators 412 such that a force axis is oriented normal to the user's skin, as described below.

Figure 5:
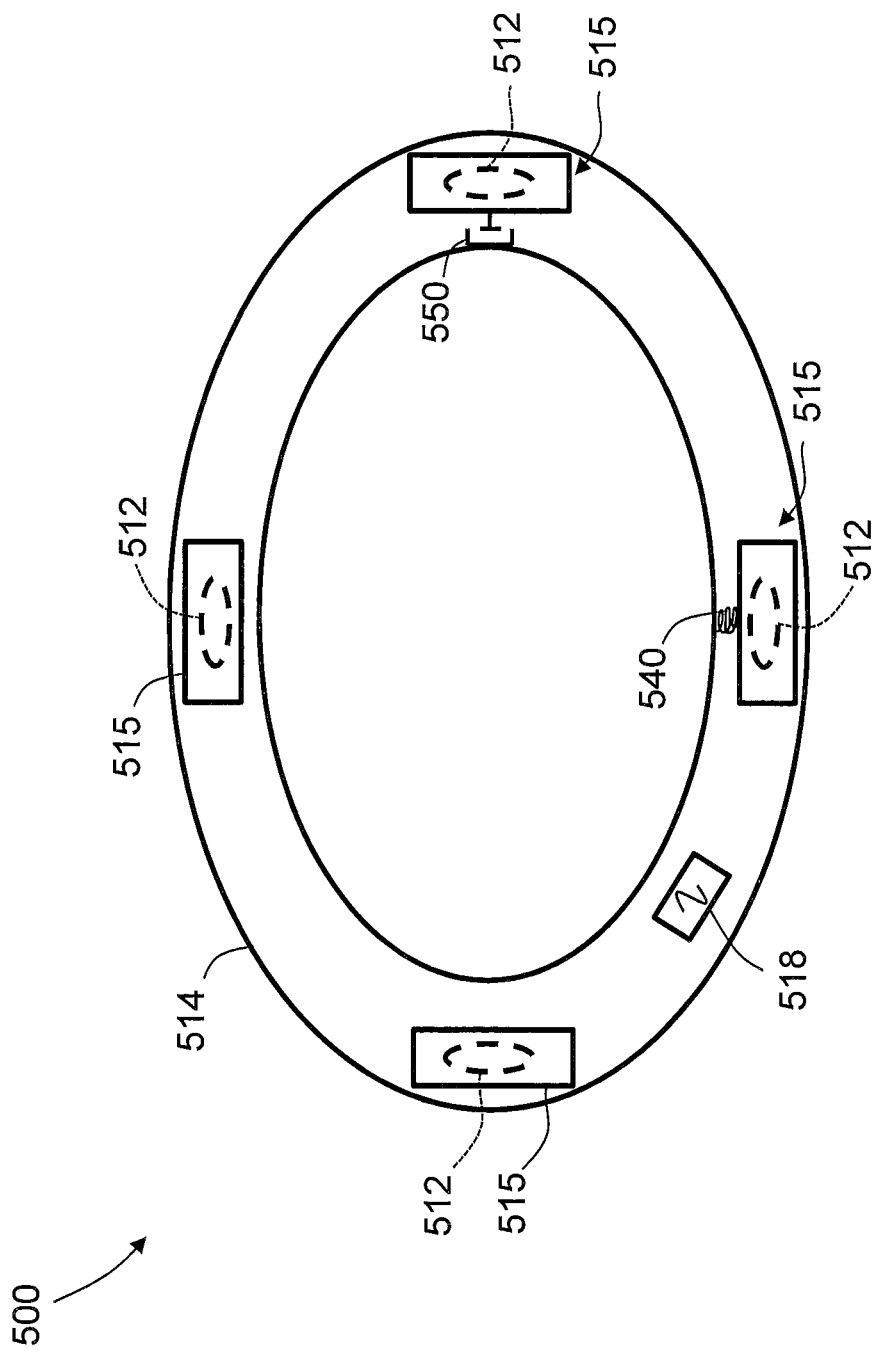
FIG. 5 is a schematic illustration of a plurality of casings, each enclosing the haptic output device illustrated in FIG. 4A and connected to a flexible mounting, in accordance with embodiments of the invention.

FIG. 5 illustrates an embodiment of a wearable device 500 that includes a wearable member 514, which may in the form of a band, such as a head band, a wrist band, a torso band, or any other type of band that may be worn by a user, and four haptic output devices 512 connected to the wearable member 514 in spaced relation to each other. The wearable member 514 may be made from any suitable material, and may be rigid, or flexible in stiffness.

As illustrated, the wearable device 500 includes a plurality of flexible mountings 515, and each haptic output device 512 is connected to the wearable member 514 via a flexible mounting 515. The flexible mounting 515 may include a flexible casing, such as the flexible casing 415 described above. In an embodiment, the flexible mounting 515 may include a spring 540 or a damper 550 configured to connect the haptic output device 512 to the wearable member 514, as illustrated in FIG. 5. The wearable device 500 may also include a signal generator 518 that may also be connected to the wearable member 514.

In an embodiment, the wearable member 514 may be made from a flexible material such as flexible rubber, flexible plastic or cloth material. In an embodiment, the wearable member 514 may be made from materials of different stiffness. For example, in an embodiment, the wearable member 514 may include portions made from a first material to which the flexible mountings 515 are attached or embedded therein and portions made from a second material in between the portions made from the first material. The second material may be stiffer than the first material so that the haptic output devices 512 have at least some freedom to move, but vibrations generated by the haptic output devices 512 are prevented from propagating along the wearable member 514 by the second material to better localize the haptic sensations. In an embodiment, the wearable member 514 may be considered to be a flexible mounting or part of a flexible mounting when the wearable member 514 itself is flexible.

Figure 6:
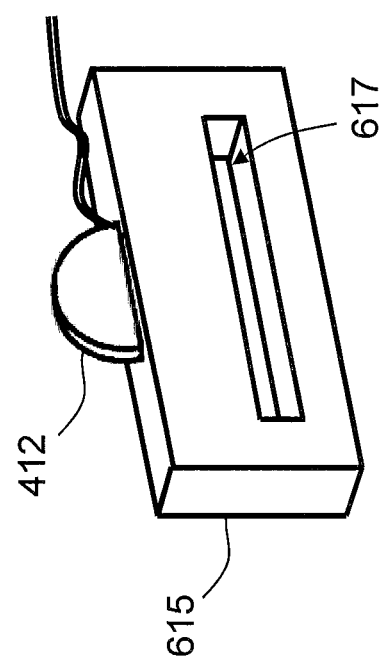
FIG. 6 is a schematic illustration of a mount partially enclosing the haptic output device illustrated in FIG. 4A, in accordance with embodiments of the invention.

FIG. 6 illustrates an embodiment that includes the ERM actuator 412 partially contained within a flexible mounting 615 that is more rigid than the flexible casing 415 described above. For example, the flexible mounting 615 may be made from a stiffer rubber or plastic material, as compared to the material used for the flexible casing 415. The flexible mounting 615 may include an opening 617 through which a wearable member may extend. Such an arrangement orients one of the force axes of the ERM actuator 412 perpendicular or normal to the user's skin such that when a short duration control pulse is sent to the ERM actuator 412, the flexible mounting 615 may create a soft transient deformation effect to be felt by the user. The flexible mounting 615 may be used as one or more of the flexible mountings 515 illustrated in FIG. 5.

By flexible coupling the haptic output device 112 and having the haptic output device 112 coupled closely to a user's skin with the flexible mounting 115, and generating short duration control pulses to drive the haptic output device 112, the sensation of a small push or depression on the user may be created, which provides a more natural or human like sensation, as opposed to a high frequency vibration, which may feel like a buzzing sensation. In an embodiment, the short duration control pulse may be less than 100 ms in duration. In an embodiment, the short duration control pulse may be less than 50 ms in duration. In an embodiment, the short duration control pulse may be less than 30 ms in duration.

When the haptic output device 112 is an ERM actuator, the application of a short duration control pulse will cause the rotating mass of the actuator to only spin less than a complete revolution or up to a few times, which will cause a small movement of the housing of the ERM actuator, which creates a soft transient rather than continuous haptic sensation. Soft transient deformation sensations provide more natural (and human-like) haptic interaction (as opposed to vibrations) and may create a wider range of pleasant sensations to a user. If the haptic output device 112 is positioned near a vein or artery of the user, the soft transient sensations may feel like a heartbeat to the user, which may be used in a gaming application to create a throbbing sensation. In an embodiment, the signal generator 118 may be configured to generate short duration control pulses to create soft transient deformations, as well as conventional control pulses as are known in the art to create vibrations.

In accordance with embodiments of the invention, both localized and directional haptic effects may be created. Although an ERM actuator is described above, it should be understood that such an actuator is only an example of the haptic output device 112 that may be used in accordance with the embodiments of the invention. For example, the haptic output device 112 may include any inertial-type actuator, including a linear resonant actuator. Also, the haptic output device 112 may include a piezoelectric actuator or any other actuator described above that is configured to provide a small deformation sensation when a short duration control pulse (i.e. voltage) is applied thereto.

In an embodiment, an application (e.g., a computer program) running on the user interface device 120 sends a signal to the processor 116 of the wearable device 110 that calls for a haptic effect to be played according to the function of the application. For example, in a gaming application, a haptic effect may be called for when the user's hand contacts an object in the game. The processor 116 on the wearable device 110 receives a signal calling for the haptic effect from the user interface device 120 that is controlling the game, processes it with the modules 202 and 204 described above, and generates the desired control signal, i.e. voltage signal, with the signal generator 118 and communicates the control signal to the haptic output device 112. The haptic effect is generated by the haptic output device 112 and the user may experience a soft transient deformation sensation indicating that he/she has contacted the virtual object in the game.

In an embodiment, the wearable device 110 may be configured to be a wrist band for a user's wrist, and the user interface device 120 may be, for example, a gaming controller or a smartphone and haptic effects called for by the gaming controller or smartphone may be provided to the user through the wrist band. In an embodiment, the wearable device 110 may be configured to be worn by the user's head, and the user interface device 120 may be, for example, a head-mounted user interface, such as a head-mounted display, or a smartphone and haptic effects called for by the head-mounted user interface or smartphone may be provided to the user's head by the wearable device 110. In an embodiment, the wearable device 110 may be configured to be worn around the user's torso, and the user interface device 110 may be, for example, a gaming controller or a smartphone and the haptic effect called for by the gaming controller or smartphone may be provided to the user's torso by the wearable device 110. Other implementations of the system 100 in accordance with embodiments of the invention described herein are possible and the above-described implementations should not be considered to be limiting in any way.

The wearable device in accordance with embodiments of the invention described above allows for the creation of a wider range of haptic effects, including standard vibrations, and the ability to create soft transient deformation sensations. Increasing the range of haptic effects that are more natural (e.g. pressure, deformation) for wearable devices may add more value to the haptic functions for wearable devices, such as notification, information transfer, etc. The soft transient deformation sensations may convey information to the user in a more pleasant fashion than standard vibrations. In addition, embodiments of the invention may allow for a relatively low cost option for haptics-enabled wearable devices by using low cost haptic output devices, such as low cost ERM actuators, and using less overall power (compared to the standard control signals that are used to generate vibrations) by using short duration control pulses to generate the haptic sensations.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system comprising:
    a wearable device configured to be worn by a user, the wearable device comprising
        a flexible wearable member,
        a haptic output device, and
        a flexible mounting comprising a flexible casing surrounding the haptic output device and connecting the haptic output device to the flexible wearable member, wherein the flexible mounting is coupled to the flexible wearable member such that at least a first portion of the flexible casing forms a surface of the wearable device and at least a second portion of the flexible casing is located between the haptic output device and the flexible wearable member, wherein the first portion of the flexible casing configured to form the surface of the wearable device is directly connected to the haptic output device; and
    a signal generator configured to generate a haptic signal and communicate the haptic signal to the haptic output device, the haptic signal comprising a short duration control pulse configured to create a deformation sensation to the user,
    wherein the flexible wearable member includes first flexible wearable member portions and second flexible wearable member portions with each second flexible wearable member portion disposed between two first flexible wearable member portions, wherein the first flexible wearable member portions are more flexible than the second flexible wearable member portions, and wherein the flexible mounting is connected to the flexible wearable member at one of the first flexible wearable member portions.

2. The system according to claim 1, wherein the signal generator is attached to the flexible wearable member.

3. The system according to claim 1, wherein the flexible mounting comprises a spring disposed between the the haptic output device and the flexible wearable member.

4. The system according to claim 1, wherein the flexible mounting comprises a damper disposed between the haptic output device and the flexible wearable member.

5. The system according to claim 1, further comprising a plurality of haptic output devices connected to the flexible wearable member via a plurality of flexible mountings, wherein the signal generator is configured to generate a plurality of haptic signals and communicate the haptic signals to the plurality of haptic output devices, the plurality of haptic signals comprising short duration control pulses to create small deformation sensations to the user.

6. The system according to claim 5, wherein the signal generator is configured to generate the plurality of haptic signals and communicate the haptic signals to the plurality of haptic output devices to create at least one directional haptic effect.

7. The system according to claim 5, wherein the signal generator is configured to generate the plurality of haptic signals and communicate the haptic signals to the plurality of haptic output devices to create at least one localized haptic effect.

8. The system according to claim 5, wherein the signal generator is configured to generate the plurality of haptic signals and communicate the haptic signals to the plurality of haptic output devices to create a haptic effect in a spatial pattern.

9. The system according to claim 1, wherein the haptic output device is an eccentric rotating mass, and wherein the haptic output device is connected to the flexible wearable member such that an axis of rotation of the eccentric rotating mass is parallel to the user's skin when the user is wearing the flexible wearable member.

10. The system according to claim 9, wherein the flexible mounting includes an opening, and wherein flexible wearable member is disposed through the opening to connect the flexible mounting to the flexible wearable member.

11. A method comprising:
    connecting a haptic output device to a flexible wearable member of a wearable device using a flexible mounting comprising a flexible casing surrounding the haptic output device, wherein the wearable device is configured to be worn by a user, and wherein the flexible mounting is coupled to the flexible wearable member such that at least a first portion of the flexible casing is configured to form a surface of the wearable device and at least a second portion of the flexible casing is located between the haptic output device and the flexible wearable member, wherein the first portion of the flexible casing configured to form the surface of the wearable device is directly connected to the haptic output device;
    generating a haptic signal comprising a short duration control pulse; and
    energizing the haptic output device with the short duration control pulse,
    wherein the flexible wearable member includes first flexible wearable member portions and second flexible wearable member portions with each second flexible wearable member portion disposed between two first flexible wearable member portions, wherein the first flexible wearable member portions are more flexible than the second flexible wearable member portions, and wherein the step of connecting the plurality of haptic output devices to the flexible wearable member comprises connecting the flexible casing to one of the first flexible wearable member portions.

12. The method according to claim 11, further comprising:
   connecting a plurality of haptic output devices to the flexible wearable member using a plurality of flexible mountings;
   generating a plurality of haptic signals comprising short duration control pulses; and
   energizing the plurality of haptic output devices with the short duration control pulses to create small deformation sensations to the user.

13. The method according to claim 12, wherein the plurality of haptic output devices are energized to create at least one directional haptic effect.

14. The method according to claim 12, wherein the plurality of haptic output devices are energized to create at least one localized haptic effect.

15. The method according to claim 12, wherein the plurality of haptic output devices are energized to create a haptic effect in a spatial pattern.

16. The method according to claim 11, wherein the haptic output device is an eccentric rotating mass, and wherein the step of connecting the haptic output device to the flexible wearable member comprises connecting the haptic output device to the flexible wearable member such that an axis of rotation of the eccentric rotating mass is parallel to the user's skin when the user is wearing the flexible wearable member.

17. The method according to claim 16, wherein the flexible mounting includes an opening, and wherein the step of connecting the haptic output device to the flexible wearable member comprises extending the flexible wearable member through the opening.

* * * * *